(12) United States Patent
Bray et al.

(10) Patent No.: US 7,997,473 B2
(45) Date of Patent: Aug. 16, 2011

(54) METHOD OF FRICTION WELDING

(75) Inventors: Simon E. Bray, Derby (GB); Michael D. Rowlson, Hexham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/835,182

(22) Filed: Jul. 13, 2010

(65) Prior Publication Data

US 2011/0031299 A1 Feb. 10, 2011

(30) Foreign Application Priority Data

Aug. 6, 2009 (GB) .................................... 0913655.7

(51) Int. Cl.
*B23K 20/12* (2006.01)
(52) U.S. Cl. ..................................... 228/112.1
(58) Field of Classification Search .................. None
See application file for complete search history.

(56) References Cited

U.S. PATENT DOCUMENTS

| | | | |
|---|---|---|---|
| 4,581,300 A * | 4/1986 | Hoppin et al. ................. | 428/546 |
| 4,934,583 A | 6/1990 | Patsfall | |
| 5,511,949 A | 4/1996 | Thore | |
| 5,865,364 A | 2/1999 | Trask et al. | |
| 6,219,916 B1 * | 4/2001 | Walker et al. ............... | 29/889.21 |
| 6,230,958 B1 | 5/2001 | Coletta et al. | |
| 6,386,428 B2 * | 5/2002 | Claxton ........................ | 228/175 |
| 6,542,843 B1 | 4/2003 | Metzinger et al. | |
| 6,595,401 B2 * | 7/2003 | Collot et al. ................. | 228/44.3 |
| 6,616,408 B1 * | 9/2003 | Meier ......................... | 416/193 A |
| 6,660,407 B1 * | 12/2003 | Bender et al. ................. | 428/615 |
| 6,666,653 B1 * | 12/2003 | Carrier ....................... | 416/213 R |
| 6,880,743 B1 | 4/2005 | Coletta et al. | |
| 7,735,223 B2 * | 6/2010 | Clark et al. ................. | 29/889.21 |
| 2002/0127108 A1 * | 9/2002 | Crall et al. ................ | 416/213 R |

(Continued)

FOREIGN PATENT DOCUMENTS

EP 1 052 370 A2 11/2000

(Continued)

OTHER PUBLICATIONS

Search Report issued in British Patent Application No. 0913655.7, on Sep. 17, 2009.

(Continued)

*Primary Examiner* — Kiley Stoner
(74) *Attorney, Agent, or Firm* — Oliff & Berridge, PLC

(57) ABSTRACT

A method of friction welding comprising providing a first workpiece (24) having a first weld surface (38) and a second workpiece (26) having a second weld surface (40). In a first region (42) adjacent the first weld surface (38) the first workpiece (24) is arranged at an angle ($\alpha$) of substantially 90° to the first weld surface (38) and in a second region (44) adjacent to the first region (42) the first workpiece (24) tapers away from the first weld surface (38). The first workpiece (24) is arranged such that in the second region (44) the first workpiece (24) is arranged at an angle ($\beta$) greater than 90° and less than 180° to the first weld surface (38). The first and second workpieces (24, 26) are arranged such that first weld surface (38) of the first workpiece (24) abuts the second weld surface (40) of the second workpiece (26). The first and second workpieces (24, 26) are moved relative to each other such that the temperature increases at the weld surfaces (38, 40) to create a weld interface (46) and then the movement is stopped to cool to weld the first and second workpieces (24, 26) together.

29 Claims, 2 Drawing Sheets

U.S. PATENT DOCUMENTS

| | | | |
|---|---|---|---|
| 2005/0005445 A1* | 1/2005 | Ferte et al. | 29/889.2 |
| 2005/0127138 A1* | 6/2005 | Bacon et al. | 228/112.1 |
| 2008/0219853 A1* | 9/2008 | Baker et al. | 416/241 R |
| 2009/0108051 A1 | 4/2009 | Bamberg et al. | |
| 2009/0269193 A1* | 10/2009 | Larose et al. | 415/200 |
| 2009/0304514 A1* | 12/2009 | Izadi et al. | 416/213 R |
| 2009/0314823 A1* | 12/2009 | Bray | 228/112.1 |
| 2010/0239428 A1* | 9/2010 | Carrier et al. | 416/230 |

FOREIGN PATENT DOCUMENTS

| | | |
|---|---|---|
| JP | A-08-243764 | 9/1996 |
| WO | WO 2008/017800 A1 | 2/2008 |

OTHER PUBLICATIONS

Nov. 18, 2010 Search Report issued in European Patent Application No. 10169340.

* cited by examiner

METHOD OF FRICTION WELDING

The present invention relates to a method of friction welding and in particular to a method of linear friction welding, to a method of rotary friction welding or to a method of orbital friction welding.

WO2008017800A1 describes a method of friction welding in which the first workpiece is arranged such that it tapers away from the first weld surface and converges in a direction away from the first weld surface. This is to reduce the flow rate of weld flash material during the friction welding process to reduce the formation of strain induced porosity at the edges of the weld.

However, it has been found that for large taper angles the edges of the first weld surface break away due to a lack of support and this leads to reduced control of the contact area and the forging pressure etc. Therefore, the method of WO2008017800A1 may only be used with low taper angles and this reduces the benefits of the method of WO2008017800A1.

Accordingly the present invention seeks to provide a novel method of friction welding which reduces, preferably overcomes, the above mentioned problem.

Accordingly the present invention provides a method of friction welding comprising providing a first workpiece having a first weld surface and a second workpiece having a second weld surface, arranging the first workpiece such that in a first region adjacent the first weld surface the first workpiece is arranged at an angle of substantially 90° to the first weld surface, arranging the first workpiece such that in a second region adjacent to the first region the first workpiece tapers away from the first weld surface, the first workpiece converging in a direction away from the first weld surface in the second region, arranging the first workpiece such that in the second region the first workpiece is arranged at an angle greater than 90° and less than 180° to the first weld surface, positioning the first and second workpieces such that first weld surface of the first workpiece abuts the second weld surface of the second workpiece, moving the first and second workpieces relative to each other such that at least one of the weld surfaces of at least one of the workpieces moves relative to the other weld surface of the other workpiece such that the temperature increases at the weld surfaces to create a weld interface, stopping the movement and allowing the first and second workpieces to cool to weld the first and second workpieces together.

Preferably the method comprises arranging the first workpiece such that in the second region the first workpiece is arranged at an angle greater than 110° and less than 180° to the first weld surface.

Preferably the method comprises arranging the first workpiece such that in the second region the first workpiece is arranged at an angle greater than 110° and less than 160° to the first weld surface.

Preferably the method comprises arranging the first workpiece such that in the second region the first workpiece is arranged at an angle greater than 110° and less than 140° to the first weld surface.

Preferably the method comprises arranging the first workpiece such that in the second region the first workpiece is arranged at an angle of 115°, 125° or 135° to the first weld surface.

Preferably the method comprises arranging the second workpiece such that in a first region adjacent the second weld surface the second workpiece is arranged at an angle of substantially 90° to the second weld surface, arranging the second workpiece such that in a second region adjacent to the first region the second workpiece tapers away from the second weld surface, the second workpiece converging in a direction away from the second weld surface in the second region, arranging the second workpiece such that in the second region the second workpiece is arranged at an angle greater than 90° and less than 180° to the second weld surface.

Preferably the method comprises arranging the second workpiece such that in the second region the second workpiece is arranged at an angle greater than 110° and less than 180° to the second weld surface.

Preferably the method comprises arranging the second workpiece such that in the second region the second workpiece is arranged at an angle greater than 110° and less than 160° to the second weld surface.

Preferably the method comprises arranging the second workpiece such that in the second region the second workpiece is arranged at an angle greater than 110° and less than 140° to the second weld surface.

Preferably the method comprises arranging the second workpiece such that in the second region the second workpiece is arranged at an angle of 115°, 125° or 135° to the second weld surface.

Preferably the first workpiece is a rotor and the second workpiece is a rotor blade. Preferably the rotor is a fan rotor and the rotor blade is a fan blade. The rotor may be a compressor rotor or a compressor drum and the rotor blade is a compressor blade.

Preferably the first workpiece and the second workpiece comprise a titanium alloy. Preferably the titanium alloy comprises 6 wt % aluminium, 4 wt % vanadium and the balance titanium plus minor additions and incidental impurities. Alternatively the titanium alloy comprises 6 wt % aluminium, 2 wt % tin, 4 wt % vanadium, 6 wt % molybdenum and the balance titanium plus minor additions and incidental impurities.

Alternatively the first workpiece is a rotor and the second workpiece is a rotor. The first workpiece may be a shaft, a stub-shaft, a disc or a drum and the second workpiece may be a shaft, a stub-shaft, a disc or a drum.

The first workpiece may comprise steel, nickel or titanium and the second workpiece may comprise steel, nickel or titanium.

Preferably the moving of the first and second workpieces relative to each other comprises oscillating.

Preferably the oscillating of the first and second workpieces comprises a linear motion.

Preferably the method comprises friction welding a plurality of second workpieces onto the first workpiece.

Preferably the first workpiece comprises at least one outwardly extending portion and the first weld surface is on the outwardly extending portion of the first workpiece.

Preferably the first workpiece comprises a plurality of outwardly extending portions, each outwardly extending portion of the first workpiece has a first weld surface and a plurality of second workpieces are friction welded to the first workpiece, each second workpiece is friction welded to a respective one of the outwardly extending portions.

Alternatively the moving of the first and second workpieces relative to each other comprises a rotary motion.

The present invention will be more fully described by way of example with reference to the accompanying drawings in which:—

Figure 1:
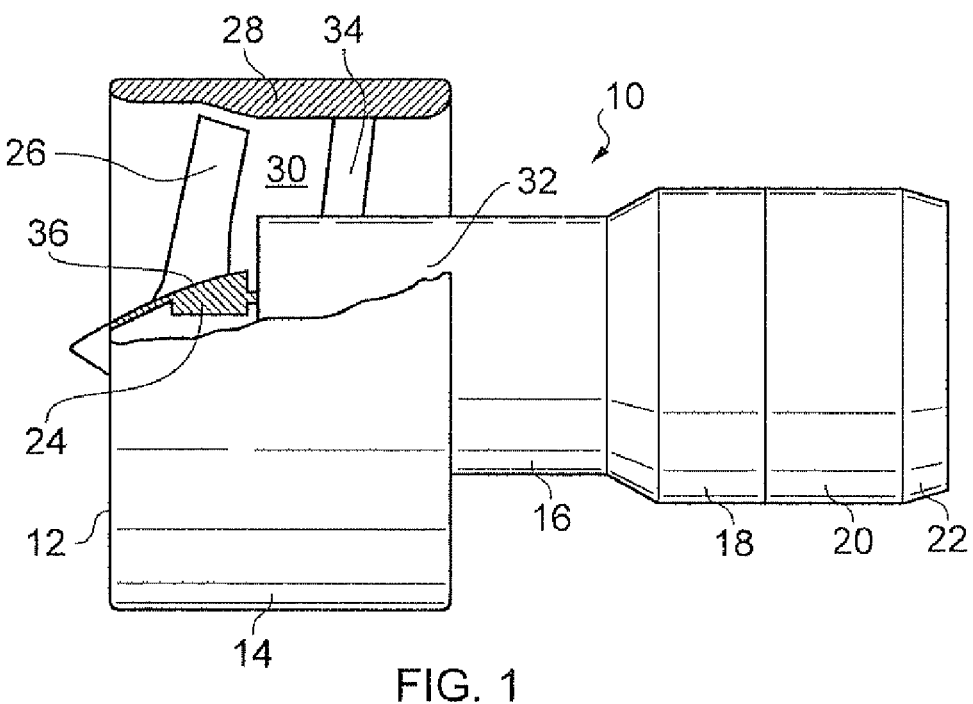
FIG. 1 shows a turbofan gas turbine engine having a rotor blade friction welded onto a rotor using a method according to the present invention.
Figure 2:
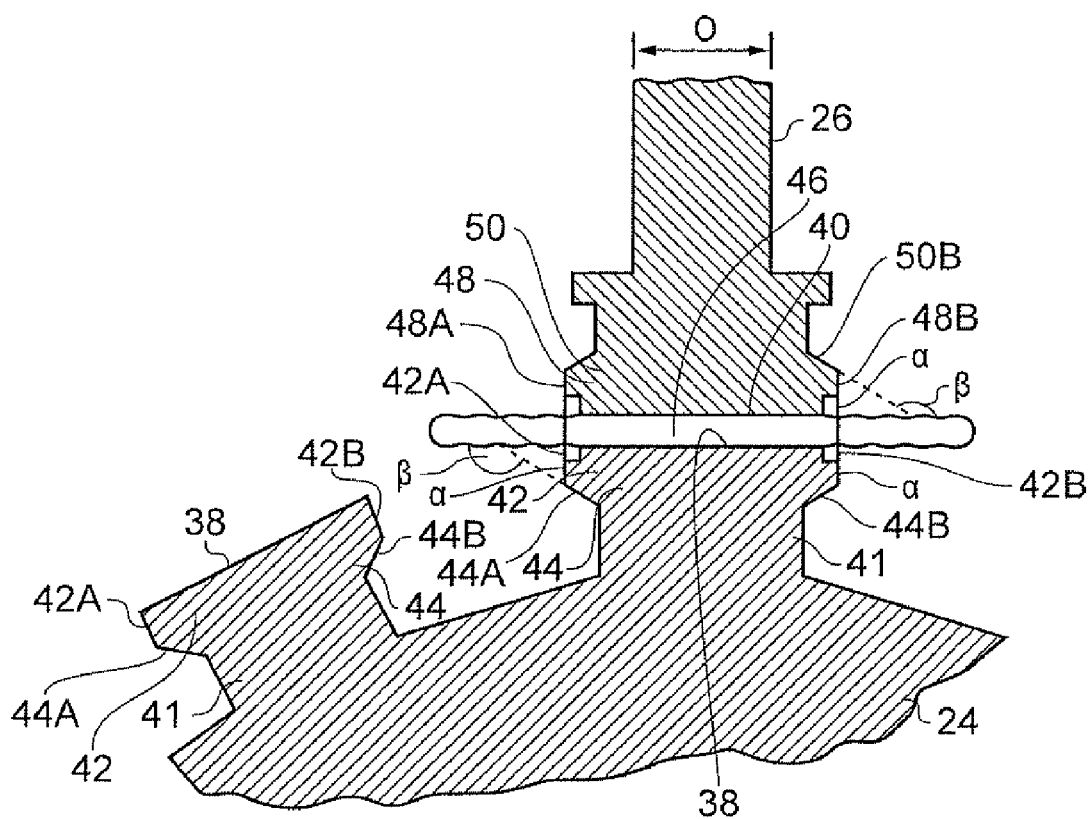
FIG. 2 shows an end view of a first and second workpieces undergoing friction welding according to the present invention.
Figure 3:
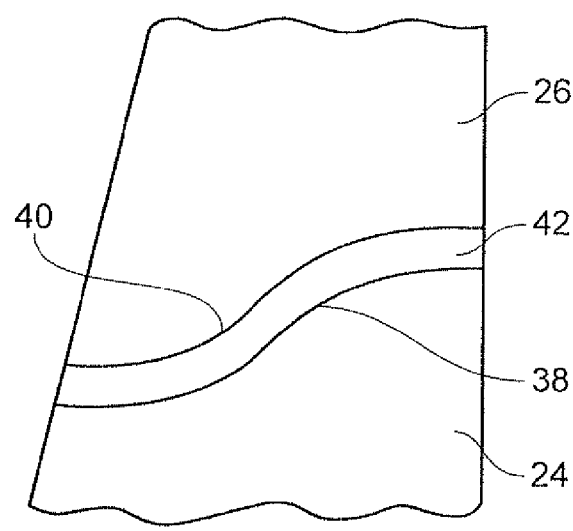
FIG. 3 shows a side view of a curvilinear weld plane between the first and second workpieces undergoing friction welding in FIG. 2.

A turbofan gas turbine engine 10, as shown in FIG. 1, comprises in flow series an inlet 12, a fan section 14, a compressor section 16, a combustion section 18, a turbine section 20 and an exhaust 22. The fan section 14 comprises a fan rotor 24 carrying a plurality of circumferentially spaced radially outwardly extending fan blades 26. The fan section 14 also comprises a fan casing 28, which is arranged coaxially with, and surrounds the fan rotor 24 and fan blades 26. The fan casing 28 defines a fan duct 30. The fan casing 28 is secured to a core engine casing 32 by a plurality of circumferentially spaced and radially extending fan outlet guide vanes 34.

The compressor section 16 comprises one or more compressors, e.g. an intermediate pressure compressor (not shown) and a high pressure compressor (not shown) or a high pressure compressor (not shown). The turbine section 20 comprises one or more turbines, e.g. a high pressure turbine (not shown), an intermediate pressure turbine (not shown) and a low pressure turbine (not shown) or a high pressure turbine (not shown) and a low pressure turbine (not shown).

The fan blades 26 are integral with the fan rotor 24 and the fan blades 26 are joined to the fan rotor 24 by linear friction welds 36.

A method of friction welding a first workpiece, e.g. the fan rotor 24, to second workpieces, e.g. the fan blades 26 is described with reference to FIGS. 2 to 5. The method of friction welding comprises providing the first workpiece, the fan rotor, 24 with a first weld surface 38 and the second workpiece, the fan blades, 26 with a second weld surface 40. The first workpiece, the fan rotor, 24 is arranged such that in a first region 42 adjacent the first weld surface 38 the first workpiece, the fan rotor, 24 is arranged at an angle α of substantially 90° to the first weld surface 38. The first workpiece, the fan rotor, 24 is arranged such that in a second region 44 adjacent to the first region 42 the first workpiece, the fan rotor, 24 tapers away from the first weld surface 38 and the first workpiece, the fan rotor, 24 converges in a direction away from the first weld surface 38 in the second region 44. The first workpiece, fan rotor, 24 is arranged such that in the second region 44 of the first workpiece, fan rotor, 24 is arranged at an angle β greater than 90° and less than 180° to the first weld surface 38. The first and second workpieces, fan rotor and fan blade, 26 and 26 respectively are arranged such that first weld surface 38 of the first workpiece, fan rotor, 24 abuts the second weld surface 40 of the second workpiece, fan blade, 26 and the first and second workpieces, fan rotor and fan blade, 24 and 26 respectively are moved relative to each other, as shown by arrows O, such that at least one of the weld surfaces 38, 40 of at least one of the workpieces 24, 26 moves relative to the other weld surface 40, 38 of the other workpiece 26, 24 while pressure, a forge force, is applied to push the first and second workpieces 24 and 26 towards each other such that the temperature increases at the weld surfaces 38, 40 to create a weld interface 46. The movement is stopped to allow the first and second workpieces, fan rotor and fan blade, 24 and 26 respectively to cool to weld the first and second workpieces, fan rotor and fan blade, 24 and 26 together.

The first workpiece, fan rotor, 24 is arranged such that in the first region 42 of the first workpiece, fan rotor, 24 the side surfaces 42A and 42B are arranged at an angle α of 90° to the first weld surface 38. The first workpiece, fan rotor, 24 is arranged such that in the second region 44 of the first workpiece, fan rotor, 24 the side surfaces 44A and 44B are arranged at an angle β greater than 110° and less than 180° to the first weld surface 38. The first workpiece, the fan rotor, 24 may be arranged such that in the second region 44 of the first workpiece, the fan rotor, 24 the side surfaces 44A and 44B are arranged at an angle β greater than 110° and less than 160° to the first weld surface 38. The first workpiece, the fan rotor, 24 may be arranged such that in the second region 44 of the first workpiece, the fan rotor, 24 the side surfaces 44A and 44B are arranged at an angle β greater than 110° and less than 140° to the first weld surface 38. In particular examples the first workpiece, fan rotor, 24 is arranged such that in the second region 44 of the first workpiece, the fan rotor, 24 the side surfaces 44A and 44B are arranged at an angle β of 115°, 125° or 135° to the first weld surface 38.

The second workpiece 26 is arranged such that in a first region 48 adjacent the second weld surface 40 the second workpiece, fan blade, 26 is arranged at an angle α of substantially 90° to the second weld surface 40 and the second workpiece, the fan blade, 26 is arranged such that in a second region 50 adjacent to the first region 48 the second workpiece, fan blade, 26 tapers away from the second weld surface 40 and the second workpiece, fan blade, 24 converges in a direction away from the second weld surface 40 in the second region 50. The second workpiece, fan blade, 26 is arranged such that in the second region 50 the second workpiece, fan blade, 24 is arranged at an angle β greater than 90° and less than 180° to the second weld surface 40.

The second workpiece 26 is arranged such that in the first region 48 of the second workpiece, fan blade, 26 the side surfaces 48A and 48B are arranged at an angle α of 90° to the second weld surface 40. The second workpiece 26 is arranged such that in the second region 50 of the second workpiece 24 the side surfaces 50A and 50B are arranged at an angle β greater than 110° and less than 180° to the second weld surface 40. The second workpiece 26 may be arranged such that in the second region 50 of the second workpiece 26 the side surfaces 50A and 50B are arranged at an angle β greater than 110° and less than 160° to the second weld surface 40. The second workpiece 26 may be arranged such that in the second region 50 of the second workpiece 26 the side surfaces 50A and 50B are arranged at an angle β greater than 110° and less than 140° to the second weld surface 40. In particular examples the second workpiece 26 may be arranged such that in the second region 50 the second workpiece 26 the side surfaces 50A and 50B are arranged at an angle β of 115°, 125° or 135° to the second weld surface 40.

Figure 4:
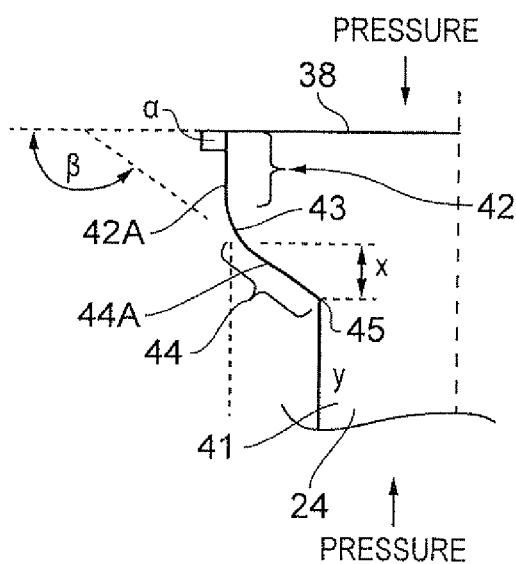
FIG. 4 is an enlarged view of one half of one workpiece before friction welding occurs.

As seen in FIG. 4 there is a smooth gradual transition from the first region 42 to the second region 44 of the first workpiece 24. There is a generous radius at the transition from the second region 44 to the main portion of the first workpiece 24. The first region 42 of the first workpiece 24 as mentioned is arranged at an angle α of 90° to the first weld surface 38 and during the friction welding process the initial main upset occurs in the first region 42 of the first workpiece 24. The second region 44 of the first workpiece 24 is arranged at the optimum angle β relative to the first weld surface 38 and the final upset occurs in the second region 44 of the first workpiece 24. The second workpiece is also arranged in the same manner.

Figure 5:
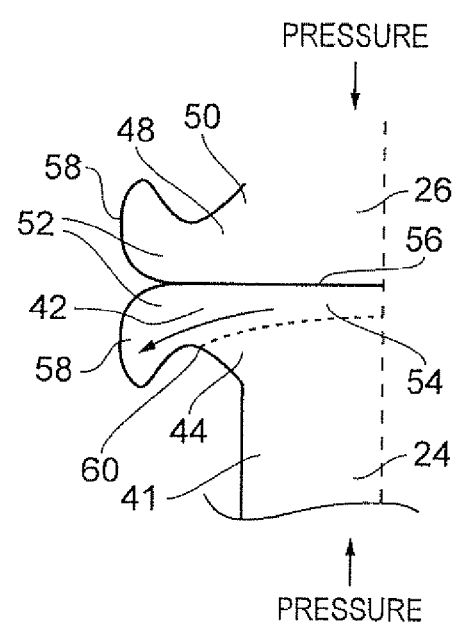
FIG. 5 is an enlarged view of one half of both workpieces during friction welding.

As seen in FIG. 5 a bifurcated flash 52 is formed and there is a plastic flow zone 54 adjacent the final weld plane 56. In addition it is seen that the radius, or stress concentration, 60 formed where the plastic flow 58 of flash occurs is reduced and this avoids the risk of edge cracking at this location and reduces the formation of strain induced porosity. The smooth transition 43 from the first region 42 to the second region 44 avoids discontinuities in the flash formation and avoids additional issues with flash break away and/or stub rigidity. The axial length of the second region 44 is arranged to accommodate the inherent upset variation in a normal friction welding process. It is likely that the base 45 of the second region 44 may exhibit plastic deformation and hence there is a need for a generous radius typically 5 mm to avoid cracking in this region.

In this example first workpiece, fan rotor, 24 comprises at least one outwardly extending portion 41 and the first weld surface 38 is on the outwardly extending portion 41 of the first workpiece, fan rotor 24. In addition the first workpiece, fan rotor, 24 comprises a plurality of outwardly extending portions 41, each outwardly extending portion 41 of the first workpiece, fan rotor, 24 has a first weld surface 38 and a plurality of second workpieces, fan blades, 24 are friction welded to the first workpiece, fan rotor, 24 and each second workpiece, fan blade, 26 is friction welded to a respective one of the outwardly extending portions 41 of the first workpiece, fan rotor 24.

The moving of the first workpiece, fan rotor, 24 and second workpieces, fan blades, 26 relative to each other comprises oscillating and in particular the oscillating of the first and second workpieces 24, 26 comprises a linear motion.

The first workpiece, fan rotor, 24 and the second workpieces, fan blades, 24 comprise a titanium alloy. The titanium alloy may comprise 6 wt % aluminium, 4 wt vanadium and the balance titanium plus minor additions and incidental impurities or alternatively the titanium alloy comprises 6 wt % aluminium, 2 wt % tin, 4 wt % vanadium, 6 wt % molybdenum and the balance titanium plus minor additions and incidental impurities. Other suitable titanium alloys may be used.

Although the present invention has been described with reference to a fan rotor and fan blades, the present invention is equally applicable to other rotors and rotor blades for example a compressor rotor, or a compressor drum, and compressor blades or a turbine rotor and turbine blades. The compressor blades may comprise the titanium alloys mentioned above or steel and the compressor disc, or compressor drum, may comprise the titanium alloys mentioned above, nickel alloys or steel. The turbine blades may comprise nickel alloys and the turbine disc may comprise nickel alloys.

Alternatively the first workpiece may be a rotor and the second workpiece may be a rotor. The first workpiece may be a shaft, a stub-shaft, a disc or a drum and the second workpiece may be a shaft, a stub-shaft, a disc or a drum. The first workpiece may comprise steel, nickel, nickel alloy, titanium alloy or other suitable metal or alloy and the second workpiece may comprise steel, nickel, nickel alloy, titanium alloy or other suitable metal or alloy. In this method the moving of the first and second workpieces relative to each other comprises a rotary motion. The shaft, stub-shaft, disc or drum may be a gas turbine engine shaft, stub-shaft, disc or drum. The disc may be a fan disc, a compressor disc or a turbine disc, the drum may be a compressor drum or a turbine drum.

The advantages of the present invention is that it reduces or eliminates the formation of edge cracking and controls strain induced porosity and results in high quality/high integrity welds and reduces edge clean up allowance.

The present invention is applicable to inertia welding of steel workpieces where martensitic region cracks due to the flash morphology.

The present invention is applicable to many friction welding techniques, such as linear friction welding, rotary friction welding including direct drive rotary friction welding, inertia rotary friction welding and orbital friction welding. In the case of rotary friction welding it is applicable to tubular workpieces or solid workpieces and may be used to weld a tube to a plate or a bar for example for welding a boss to a casing.

The welding forge force may be constant during the friction welding process or variable with a commanded weld area increase rate to either maintain a constant interface pressure or to weld with a variable forge pressure.

Although the present invention has been described with reference to providing first and second regions on both workpieces it may be possible to provide the first and second regions on only one of the workpieces.

The invention claimed is:

1. A method of friction welding comprising:
providing a first workpiece having a first weld surface and a second workpiece having a second weld surface;
arranging the first workpiece such that in a first region adjacent the first weld surface the first workpiece is arranged at an angle of substantially 90° to the first weld surface;
arranging the first workpiece such that in a second region adjacent to the first region the first workpiece tapers away from the first weld surface, the first workpiece converging in a direction away from the first weld surface in the second region;
arranging the first workpiece such that in the second region the first workpiece is arranged at an angle greater than 90° and less than 180° to the first weld surface;
arranging the second workpiece such that in a first region adjacent the second weld surface the second workpiece is arranged at an angle of substantially 90° to the second weld surface;
arranging the second workpiece such that in a second region adjacent to the first region the second workpiece tapers away from the second weld surface, the second workpiece converging in a direction away from the second weld surface in the second region;
arranging the second workpiece such that in the second region the second workpiece is arranged at an angle greater than 90° and less than 180° to the second weld surface;
positioning the first and second workpieces such that the first weld surface of the first workpiece abuts the second weld surface of the second workpiece;
moving the first and second workpieces relative to each other such that at least one of the weld surfaces of at least one of the workpieces moves relative to the other weld surface of the other workpiece such that the temperature increases at the weld surfaces to create a weld interface; and
stopping the movement and allowing the first and second workpieces to cool to weld the first and second workpieces together.

2. A method of friction welding comprising:
providing a first workpiece having a first weld surface and a second workpiece having a second weld surface;
arranging the first workpiece such that in a first region adjacent the first weld surface the first workpiece is arranged at an angle of substantially 90° to the first weld surface;

arranging the first workpiece such that in a second region adjacent to the first region the first workpiece tapers away from the first weld surface, the first workpiece converging in a direction away from the first weld surface in the second region;

arranging the first workpiece such that in the second region the first workpiece is arranged at an angle greater than 90° and less than 180° to the first weld surface;

positioning the first and second workpieces such that the first weld surface of the first workpiece abuts the second weld surface of the second workpiece;

moving the first and second workpieces relative to each other such that at least one of the weld surfaces of at least one of the workpieces moves relative to the other weld surface of the other workpiece such that the temperature increases at the weld surfaces to create a weld interface; and stopping the movement and allowing the first and second workpieces to cool to weld the first and second workpieces together, wherein the first workpiece has at least one side surface, in the first region of the first workpiece the at least one side surface is arranged at an angle of substantially 90° to the first weld surface, and in the second region of the first workpiece the at least one side surface is arranged at an angle greater than 90° and less than 180° to the first weld surface.

3. A method of friction welding comprising:
providing a first workpiece having a first weld surface and a second workpiece having a second weld surface;

arranging the first workpiece such that in a first region adjacent the first weld surface the first workpiece is arranged at an angle of substantially 90° to the first weld surface;

arranging the first workpiece such that in a second region adjacent to the first region the first workpiece tapers away from the first weld surface, the first workpiece converging in a direction away from the first weld surface in the second region;

arranging the first workpiece such that in the second region the first workpiece is arranged at an angle greater than 90° and less than 180° to the first weld surface;

positioning the first and second workpieces such that the first weld surface of the first workpiece abuts the second weld surface of the second workpiece;

moving the first and second workpieces relative to each other such that at least one of the weld surfaces of at least one of the workpieces moves relative to the other weld surface of the other workpiece such that the temperature increases at the weld surfaces to create a weld interface; and stopping the movement and allowing the first and second workpieces to cool to weld the first and second workpieces together, wherein during the friction welding process the main upset occurs in the first region of the first workpiece and the final upset occurs in the second region of the first workpiece.

4. A method as claimed in claim 2 wherein the first workpiece has side surfaces, in the first region of the first workpiece the side surfaces are arranged at an angle of substantially 90° to the first weld surface, and in the second region of the first workpiece the side surfaces are arranged at an angle greater than 90° and less than 180° to the first weld surface.

5. A method as claimed in claim 1 wherein the second workpiece has at least one side surface, in the first region of the second workpiece the at least one side surface is arranged at an angle of substantially 90° to the second weld surface, and in the second region of the second workpiece the at least one side surface is arranged at an angle greater than 90° and less than 180° to the second weld surface.

6. A method as claimed in claim 1 wherein during the friction welding process the main upset occurs in the first region of the second workpiece and the final upset occurs in the second region of the second workpiece.

7. A method as claimed in claim 5 wherein the second workpiece has side surfaces, in the first region of the second workpiece the side surfaces are arranged at an angle of substantially 90° to the second weld surface, and in the second region of the second workpiece the side surfaces are arranged at an angle greater than 90° and less than 180° to the second weld surface.

8. A method as claimed in claim 2 wherein the first workpiece is a rotor blade and the second workpiece is a rotor.

9. A method as claimed in claim 2, further comprising arranging the first workpiece such that in the second region the first workpiece is arranged at an angle greater than 110° and less than 180° to the first weld surface.

10. A method as claimed in claim 2, further comprising arranging the first workpiece such that in the second region the first workpiece is arranged at an angle greater than 110° and less than 160° to the first weld surface.

11. A method as claimed in claim 2, further comprising arranging the first workpiece such that in the second region the first workpiece is arranged at an angle greater than 110° and less than 140° to the first weld surface.

12. A method as claimed in claim 1, further comprising arranging the second workpiece such that in the second region the second workpiece is arranged at an angle greater than 110° and less than 180° to the second weld surface.

13. A method as claimed in claim 1, further comprising arranging the second workpiece such that in the second region the second workpiece is arranged at an angle greater than 110° and less than 160° to the second weld surface.

14. A method as claimed in claim 1, further comprising arranging the second workpiece such that in the second region the second workpiece is arranged at an angle greater than 110° and less than 140° to the second weld surface.

15. A method as claimed in claim 2 wherein the first workpiece is a rotor and the second workpiece is a rotor blade.

16. A method as claimed in claim 15 wherein the rotor is a fan rotor and the rotor blade is a fan blade.

17. A method as claimed in claim 15 wherein the rotor is a compressor rotor and the rotor blade is a compressor blade.

18. A method as claimed in claim 15 wherein the first workpiece and the second workpiece comprise a titanium alloy.

19. A method as claimed in claim 17 wherein the titanium alloy consists of 6 wt % aluminium, 4 wt % vanadium and the balance titanium plus minor additions and incidental impurities.

20. A method as claimed in claim 17 wherein the titanium alloy consists of 6 wt % aluminium, 2 wt % tin, 4 wt % vanadium, 6 wt % molybdenum and the balance titanium plus minor additions and incidental impurities.

21. A method as claimed in claim 15 wherein the moving of the first and second workpieces relative to each other comprises oscillating.

22. A method as claimed in claim 21 wherein the oscillating of the first and second workpieces comprises a linear motion.

23. A method as claimed in claim 15 wherein the method comprises friction welding a plurality of second workpieces onto the first workpiece.

24. A method as claimed in claim 23 wherein the first workpiece comprises at least one outwardly extending portion and the first weld surface is on the outwardly extending portion of the first workpiece.

25. A method as claimed in claim 24 wherein the first workpiece comprises a plurality of outwardly extending portions, each outwardly extending portion of the first workpiece has a first weld surface and a plurality of second workpieces are friction welded to the first workpiece, each second workpiece is friction welded to a respective one of the outwardly extending portions.

26. A method as claimed in claim 2 wherein the first workpiece is a rotor and the second workpiece is a rotor.

27. A method as claimed in claim 26 wherein the first workpiece is selected from the group comprising a shaft, a stub-shaft, a disc and a drum and the second workpiece is selected from the group comprising a shaft, a stub-shaft, a disc and a drum.

28. A method as claimed in claim 26 wherein the first workpiece is selected from the group comprising steel, titanium and nickel and the second workpiece is selected from the group comprising steel, titanium and nickel.

29. A method as claimed in claim 26 wherein the moving of the first and second workpieces relative to each other comprises a rotary motion.

* * * * *